3,472,625
ANALYTICAL TEST APPARATUS AND METHOD FOR DETERMINING OXIDE CONTENT OF ALKALI METAL
Judson W. Graab, Fairview Park, Louis Rosenblum, Cleveland, William E. Maple, Westlake, William A. Dupraw, Rocky River, and Randall F. Gahn, Lakewood, Ohio, assignors to the United States of America as represented by the Administrator of the National Aeronautics and Space Administration
Filed Jan. 25, 1965, Ser. No. 427,990
Int. Cl. G01n 31/16
U.S. Cl. 23—230                5 Claims

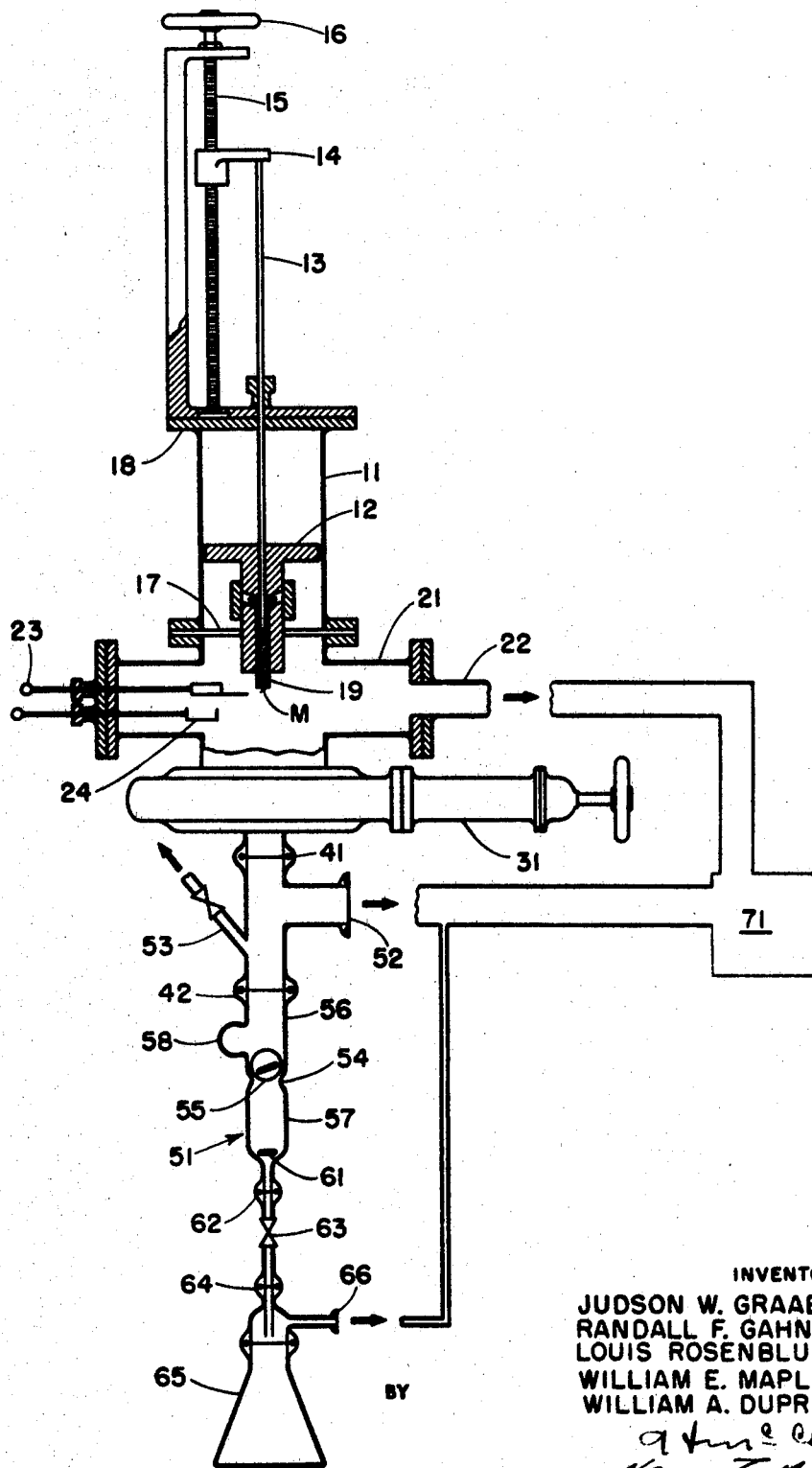

ABSTRACT OF THE DISCLOSURE

Method and apparatus for determining the oxygen in an alkali liquid metal with greater accuracy. Means under vacuum is provided for cutting off and removing a first portion of the solidified sample which may contain contaminants, then cutting off a second portion of the sample and transferring it under vacuum to an extraction chamber which is then sealed off from the extrusion chamber by a valve. Mercury is then introduced to the extraction chamber to form an amalgam. A magnetic ball check valve seats in a narrowed portion of the extraction chamber and is activated by a glass covered magnetic bar to control the flow of amalgam into a flask disposed below said extraction chamber in airtight communication therewith. The weight of the alkali metal and its oxide is then determined by titration.

---

The invention described herein may be manufactured and used by or for the Government of the United States of America for governmental purposes without the payment of any royalties thereon or therefor.

The instant invention relates to an apparatus and method for performing an analytical test and more particularly to an analytical test apparatus and method for determining the oxygen content in an alkali liquid metal such as potassium or sodium.

Liquid metals are well known to have the characteristics that make them quite desirable as heat transfer media. More particularly, interest has been evident in the use of an alkali metal such as potassium as a thermodynamic working fluid in a nuclear turboelectric power system. Since oxygen impurities in alkali metals (even below 20 p.p.m. in some cases) have been recognized as promoting and accelerating corrosion attack on containment materials, it is important that a reliable method for determining the oxygen content of a liquid metal such as potassium or sodium be available.

Hitherto, various mechanical or chemical methods have been proposed to determine the amount of oxygen present in an alkali metal. In analyzing the oxygen content of an alkali metal by chemical means, it has been proposed to place a sample of the material in an amalgamation chamber wherein mercury is introduced and a violent amalgamation reaction occurs. The amalgam is then separated from the residue which contains the oxide. The amount of alkali metal present in the amalgam and the amount of oxide present in the residue is then determined. Although the above proposed method would appear to be satisfactory in measuring the amount of oxygen present, the accuracy of the same is questionable. This is due to the fact that a major source of error may result in the analytical process due to the inadvertent introduction of oxygen or water contamination during the process of sampling, transferring, and analyzing the liquid metal. More particularly, errors may be caused due to the exposing of the sample to the atomsphere during some stage of the process or of the introduction of oxygen or water into the testing apparatus.

It is therefore an object of the present invention to provide for a new and improved apparatus and method for determining the oxygen content in an alkali liquid metal.

It is another object of the present invention to provide for a new and improved apparatus and method for determining the oxygen content in an alkali metal by chemical means.

It is still another object of the present invention to provide for a new and improved method and apparatus for determining the oxygen content in an alkali metal wherein the introduction of atmospheric and systematic contaminants are greatly reduced.

It is yet still another object of the present invention to provide for a new and improved method and apparatus for determining the oxygen content in an alkali metal by chemical means wherein replicate samples can be taken from the same quantity of material.

It is another object of the present invention to provide for a new and improved method and apparatus for determining the oxygen content in an alkali metal that has a high degree of reproducibility.

Other objects and many of the attendant advantages of this invention will be readily appreciated as the same becomes better understood by reference to the following detailed description when considered in connection with the accompanying drawing which shows a general view, partly in section, of an embodiment of the apparatus of the invention.

In order to achieve the above-mentioned and other objects, the instant invention contemplates a unique type of apparatus wherein the material to be tested is stored, transferred, sampled, and analyzed under very high vacuum conditions. Means are also provided for reducing atmospheric contaminants and a major cause of systematic contaminants. Provision is also made for taking a plurality of test samples of the same material.

Referring now to the drawings, there is shown an embodiment of the invention comprising an apparatus including an extrusion assembly and an extraction assembly. The extrusion assembly includes a hollow metal extrusion chamber 11. Disposed within the metal extrusion chamber 11 and rigidly secured thereto is a hollow elongated housing or bolster block 12. The bolster block or housing 12 is provided with a longitudinally disposed passage way in which the sample container 19 having a quantity of the test material M is disposed. Means are provided for extruding a quantity of test material M from the sample container 19. In the embodiment shown, the extruding means includes an elongated ram or rod member 13 which is connected to a bracket 14 which in turn is mounted on a worm gear 15 or other suitable means. A handle 16 is provided for at one end of the worm gear 15 for ease in turning the same. The extrusion chamber 11 is further provided with cover assemblies 17 and 18 so that said chamber can be made airtight.

The lower end of the metal extrusion chamber 11 is connected to an intermediate chamber 21 (also part of the extrusion assembly). Intermediate chamber 21 is provided with an outlet 22 for connection to a vacuum pump 71.

Means are also provided whereby a sample of the extruded material can either be moved into a test position or discarded. In the embodiment shown, the means includes a hot wire cut-off mechanism 23 and a waste tray 24 connected to intermediate chamber 21, extending into said chamber 21 and operable by means external to the chamber.

Operably connected to the lower end of the intermediate chamber is a gate valve 31. Gate valve 31 permits the sealing off of the intermediate chamber from the remaining portions of the apparatus connected therebelow.

Connected to the lower end of the gate valve 31 by means of an O-ring joint 41 is the extraction assembly portion of the apparatus which includes a hollow elongated glass extraction chamber 51. Chamber 51 is also provided with an outlet 52 connecting to a vacuum pump 71. By using O-ring joints clamped down by any type of suitable clamps known in the art, the introduction of contaminants into the system via greased or waxed joints is eliminated. The glass extraction chamber 51 includes an outlet 52 adapted to be connected to a vacuum pump and an opening 53 connecting to a supply of mercury. Located along a midportion of the glass chamber 51 is a throat or orifice section 54 which separates the upper section 56 of the chamber 51 from the lower section 57 of the chamber 51. Disposed within the upper section 56 of the chamber 51 is a freely movable magnetic ball check valve 55 sized so as to seal off the upper section 56 of the chamber from the lower section 57 when resting on the orifice section 54.

A ledge 58 or other type of offset seating means is also provided for on the upper section 56 whereby the magnetic ball check valve may be moved to and mounted in an out of the way position.

A glass covered magnetic bar member 61 is disposed and freely movable within the lower section 57 of the extraction chamber. The lower end of the lower section of the extraction chamber is connected by means of an O-ring joint 62 of the same type as O-ring joint 41 to a metal valve member 63. Metal valve 63 in turn is connected by means of an O-ring joint 64 also, similar to O-ring joint 41, to a receiving flask 65 which is provided with an outlet 66 adapted to be connected to the vacuum pump 71. With gate valve 31 open, the extrusion chamber 11, the extraction chamber 51, the intermediate chamber 21 and the flask 65 form an airtight enclosure which can be evacuated by means of the pump 71.

In operation, the apparatus is used in the following manner. The sample container 19 which is preferably a stainless-steel tube 6¾ inches long by 5/16 inch i.d. is vacuum filled with the liquid metal material to be tested such as potassium and capped and sealed. Just before the container is to be placed within the extrusion chamber the cap is removed. The container is then mounted on the bolster block or housing 12 in the extrusion chamber. The apparatus is then made airtight and evacuated to a pressure between $2\times10^{-5}$ and $4\times10^{-6}$ torr. Means (not shown) are also provided for regulating and maintaining the pressure within these limits.

A small portion of the material is then extruded from the sample tube cut with a hot wire and discarded into the waste tray. This is done because the initial portion extruded may have contaminants thereon. The analytical sample is then extruded, cut off, and dropped into the glass extraction system. The extrusion portion of the apparatus is then valved off from the extraction portion of the system by means of gate valve 31 and the ball check 55 seated in place at the orifice restriction 54 in order to confine the ensuing amalgamation reaction. The ball check valve is then raised slightly in order to admit triple distilled mercury to the lower portion of the extraction chamber. When a sufficient amount of mercury has been admitted to the lower portion 57 of the extraction chamber the ball check valve is dropped into a seating position in the orifice or throat restriction 54 and additional mercury is allowed to pour over said ball check valve in order to weigh the same down.

After the reaction has occurred, manipulation by means of a magnet of the glass covered magnetic bar 61 in the lower extraction chamber 57 removes all film from the chamber wall. The metal valve 63 on the restricted end of the lower section 57 is then opened and the thus formed amalgam is slowly removed into the receiving flask 65.

The oxide formed during the amalgamation reaction which in the case of potassium is potassium oxide is insoluble and floats on the surface of the amalgam and hence remains in the lower section of the extraction chamber 57.

The metal exit valve 63 is then closed and a quantity of mercury (around 15 milliliters) is admitted to the extraction chamber and the magnetic bar manipulated as before. The wash mercury is similarly removed as before. This step is repeated a plurality of times (approximately five times having been found to be adequate) in order to remove completely the potassium amalgam. Up to this point in the process, the total time is approximately one hour.

The glass extraction portion of the system is then brought to atmospheric pressure and the extraction system and amalgam receiving flask removed.

The potassium is then extracted from the amalgam using boiled distilled water and titrated with standard sulphuric acid to determine the weight of alkali sample used.

The potassium oxide is washed out of the extraction chamber using boiled distilled water and titrated with a standard 0.005 N sulphuric acid using a microburet. Methyl red is used as an indicator in both titrations.

The amount of oxide in this case, potassium oxide, can thus be accurately determined.

In the following table is shown an actual test using the apparatus and method and showing the high degree of reproducibility. In each testing the amount of washes was approximately five and the total amount of mercury used was approximately 700 to 900 grams. In tubes 1, 2, 3, 4, and 6, three samples were taken and in tube 5, two samples were taken.

TABLE I

| Lot | Tube No. | Oxygen, p.p.m. | Sample weight, g. |
|---|---|---|---|
| A | 1 | 13, 18, 18 | 1.06, 1.22, 1.13 |
| B | 2 | 23, 21, 22 | 0.61, 1.40, 2.06 |
| C | 3 | 88, 96, 88 | 1.15, 1.14, 1.16 |
| D | 4 | 88, 93, 93 | 0.66, 0.88, 1.22 |
| E | 5 | 186, 198 | 0.74, 1.00 |
|  | 6 | 207, 200, 196 | 1.07, 1.03, 1.06 |

Obviously, many modifications and variations of the present invention are possible in the light of the above teachings. It is therefore to be understood that within the scope of the appended claims, the invention may be practiced otherwise than as specifically described.

We claim:

1. In combination with an extraction assembly for extracting an alkali metal from an alkali metal containing an oxide thereof, an extrusion assembly for extruding a sample of an alkali metal from a given quantity and operably connected to said extraction assembly, said extrusion assembly including means for advancing the sample into said extrusion chamber, externally operated cut-off means disposed in said extrusion assembly to remove desired portions from the sample, and externally operated waste handling means disposed in said extrusion assembly for preventing selected portions of the sample from entering said extraction system; and pump means connected to said extrusion assembly for evacuating said extrusion and said extraction assemblies.

2. Apparatus according to claim 1 wherein said extraction assembly includes a generally cylindrical glass chamber having a restriction at a midportion thereof and a magnetic spherical ball valve disposed within said chamber on one portion of said chamber and freely movable therein.

3. Apparatus according to claim 2 and further including a glass covered magnetic bar disposed within said chamber at a portion within said chamber remote from said magnetic spherical valve.

4. Apparatus for use in determining the oxide content of an alkali metal comprising an airtight extrusion chamber, an extrusion bolster block mounted within said chamber and adapted to hold a sample container; an extrusion ram slidably mounted on said bolster block; means external to said chamber connected to said ram for moving said ram; an intermediate chamber connected to said extrusion chamber; externally operated cutting means mounted within said intermediate chamber; valve means connected to said intermediate chamber; a glass extraction chamber connected to said valve means and having an upper portion and a lower portion; an O-ring joint for connecting said glass extraction chamber to said valve means; restriction means for separating said above-mentioned portions; a magnetic ball valve disposed within said upper portion and freely movable therein; magnetic stirring means disposed within said lower section; a receiving container; O-ring joint means for connecting the extraction chamber to the receiving container; means for supplying a quantity of mercury to said extraction chamber; and pumping means connected to said extrusion chamber, said extraction chamber and said receiving flask for evacuating the same.

5. A method for determining the oxide content of an alkali metal sample comprising providing a sample container; evacuating said sample container; pouring a quantity of liquid alkali metal containing an oxide into said container; placing said sample container in an airtight environment; evacuating said airtight environment; extruding a first contaminated portion of the alkali metal sample from the sample container; preventing said first portion from being processed in said method; extruding a second portion of the sample of alkali metal from the sample container into the airtight environment; adding a quantity of mercury to said second portion of the sample forming thereby a heterogeneous mixture of an amalgam and an oxide; separating the amalgam from the oxide; extracting the alkali metal from the amalgam; titrating the alkali metal and determining thereby the weight of said metal; and titrating the oxide and determining thereby the weight of the oxide.

References Cited

UNITED STATES PATENTS

| 3,002,820 | 10/1961 | Hall et al. | 23—253 |
| 3,259,465 | 7/1966 | Sheen | 23—253 |

OTHER REFERENCES

Leonard P. Pepkowitz et al., Anal. Chem., 22, 1283–86 (1950).

Y. D. Malikoud et al., Analiz Gazov V. Metalakh, Akad. Nauk, SSSR (English translation—FTD-TT-62-1338, pp. 1–7 (1962).

MORRIS O. WOLK, Primary Examiner

S. MARANTZ, Assistant Examiner

U.S. Cl. X.R.

23—253; 209—43